United States Patent
Morito et al.

(10) Patent No.: US 9,150,054 B2
(45) Date of Patent: Oct. 6, 2015

(54) PNEUMATIC TIRE, TIRE MOLD, AND METHOD OF MANUFACTURING PNEUMATIC TIRE

(75) Inventors: Takumi Morito, Kanagawa (JP); Masakazu Mori, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1282 days.

(21) Appl. No.: 12/410,218

(22) Filed: Mar. 24, 2009

(65) Prior Publication Data

US 2010/0000641 A1    Jan. 7, 2010

(30) Foreign Application Priority Data

Jul. 7, 2008    (JP) ................. 2008-177251

(51) Int. Cl.
B60C 11/11 (2006.01)
B60C 11/12 (2006.01)
B60C 11/03 (2006.01)
B60C 11/01 (2006.01)
B29D 30/06 (2006.01)

(52) U.S. Cl.
CPC ............ B60C 11/0302 (2013.04); B60C 11/01 (2013.01); B60C 11/12 (2013.01); B29D 2030/0612 (2013.01); B60C 11/11 (2013.01); B60C 2011/1213 (2013.04)

(58) Field of Classification Search
CPC ........ B60C 11/01; B60C 11/11; B60C 11/12; B60C 2011/013; B60C 2011/1213; B29D 2030/0612

USPC ............ 152/209.15, 209.18, 209.21, DIG. 3, 152/902, 903, 209.16, 523; 264/326; 425/28.1

See application file for complete search history.

(56) References Cited

U.S. PATENT DOCUMENTS

| | | | |
|---|---|---|---|
| 6,253,815 B1 * | 7/2001 | Kemp et al. ................ | 152/523 |
| 6,415,835 B1 * | 7/2002 | Heinen ................ | 152/209.21 |
| 7,438,100 B2 | 10/2008 | Hashimoto | |
| 2001/0032691 A1 * | 10/2001 | Ohsawa ................ | 152/209.18 |

(Continued)

FOREIGN PATENT DOCUMENTS

| EP | 0 952 011 A2 | 10/1999 |
|---|---|---|
| EP | 1 533 141 A1 | 5/2005 |

(Continued)

OTHER PUBLICATIONS

Machine translation for Japan 2005-104385 (no date).*

(Continued)

*Primary Examiner* — Steven D Maki
(74) *Attorney, Agent, or Firm* — Greer Burns & Crain Ltd.

(57) ABSTRACT

A pneumatic tire includes a tread that has: land portions formed and segmented by a plurality of circumferential grooves extending in a tire circumferential direction and by a plurality of widthwise grooves extending in a tire width direction; and sipes formed in contact patches of the land portions. The pneumatic tire includes: recessed sections (groove-bottom recessed sections) that are formed in tire-width-direction lateral surfaces of the land portions provided in tire-width-direction outermost parts, so as to connect to the widthwise grooves; and indents/lugs that are formed in bottom surfaces of the recessed sections such that indents/lugs thereof are arranged alternately and continuously in a linear manner.

9 Claims, 10 Drawing Sheets

(56) References Cited

U.S. PATENT DOCUMENTS

| | | | |
|---|---|---|---|
| 2005/0167022 A1* | 8/2005 | Hashimoto | 152/DIG. 3 |
| 2006/0090828 A1* | 5/2006 | Yamane | 152/209.18 |
| 2007/0240801 A1* | 10/2007 | Tanaka | 152/209.21 |
| 2008/0210355 A1* | 9/2008 | Harvey et al. | 152/209.8 |
| 2008/0223495 A1* | 9/2008 | Ikeda et al. | 152/209.16 |

FOREIGN PATENT DOCUMENTS

| | | | |
|---|---|---|---|
| GB | 460338 A * | 1/1937 | |
| JP | 01-223006 A * | 9/1989 | |
| JP | 03-086605 A * | 4/1991 | |
| JP | 5-319022 | 12/1993 | |
| JP | 06-024211 A * | 2/1994 | |
| JP | U 6-13904 | 2/1994 | |
| JP | 6-183210 | 7/1994 | |
| JP | 07-186633 | 7/1995 | |
| JP | 2003-211915 A * | 7/2003 | |
| JP | A 2003-211915 | 7/2003 | |
| JP | A 2004-34903 | 2/2004 | |
| JP | 2005-104385 A * | 4/2005 | |
| JP | A 2005-104385 | 4/2005 | |
| JP | B2 3702958 | 7/2005 | |
| JP | B2 4033350 | 11/2007 | |
| JP | 2008-155685 | 7/2008 | |
| WO | WO 2005/123420 A1 | 12/2005 | |

OTHER PUBLICATIONS

Machine translation for Japan 2003-211915 (no date).*
Machine translation for Japan 06-024211 (no date).*

* cited by examiner

FIG.16

| | CONVENTIONAL EXAMPLE | EXAMPLE 1 | EXAMPLE 2 | EXAMPLE 3 | EXAMPLE 4 | EXAMPLE 5 | EXAMPLE 6 |
|---|---|---|---|---|---|---|---|
| GROOVE-BOTTOM RECESSED SECTIONS OR RAISED SECTIONS | - | YES | YES | YES | YES | YES | YES |
| INDENTS/LUGS OUTSIDE LAND PORTIONS | - | YES | YES | YES | YES | YES | YES |
| GROOVE-OPENING RECESSED SECTIONS | - | - | YES | YES | YES | YES | YES |
| RECESS DEPTH d OR RAISE HEIGHT h [mm] | - | 1.5 | 1.5 | 1.5 | 1.5 | 1.5 | 1.5 |
| DIFFERENCE di BETWEEN INDENTS/LUGS AND SURFACES [mm] | - | 0.3 | 0.3 | 0.3 | 0.3 | 0.3 | 0.3 |
| PITCH p OF LUGS [mm] | - | 0.9 | 0.9 | 0.9 | 0.9 | 0.9 | 0.9 |
| WIDTH s OF INDENTS [mm] | - | 0.3 | 0.3 | 0.3 | 0.3 | 0.3 | 0.3 |
| INDENTS/LUGS OUTSIDE LAND PORTIONS COMMUNICATE WITH INDENTS/LUGS IN LAND CONTACT PATCHES | - | - | - | YES | YES | YES | YES |
| DISTANCE BETWEEN INDENTS/LUGS IN LATERAL SIDES OF LAND PORTIONS AND OUTER PERIPHERY OF SURFACES | - | - | - | - | YES | YES | YES |
| INCLINATION OF GROOVE-BOTTOM RECESSED SECTIONS OR RAISED SECTIONS | - | - | - | - | - | YES | YES |
| ACUTE ANGLE OF ENDS OF GROOVE-BOTTOM RECESSED SECTIONS OR RAISED SECTIONS | - | - | - | - | - | - | YES |
| TURNING PERFORMANCE ON ICY ROAD | 100 | 105 | 110 | 115 | 120 | 125 | 130 |
| TURNING PERFORMANCE ON SNOWY ROAD | 100 | 105 | 110 | 115 | 120 | 125 | 130 |

PNEUMATIC TIRE, TIRE MOLD, AND METHOD OF MANUFACTURING PNEUMATIC TIRE

BACKGROUND OF THE INVENTION

1. Field of the Invention

The present invention relates to a pneumatic tire, a tire mold, and a method of manufacturing a pneumatic tire that improve turning performance on icy roads and snowy roads.

2. Description of the Related Art

Pneumatic tires, particularly pneumatic tires preferable for icy and snowy roads, can achieve turning performance by removing water films generated between the road surface and the tread surface. Known conventional pneumatic tires include sipes of a zigzag shape as seen from above, and small grooves having a shorter depth than that of the sipes, all provided in the surface of the land including a plurality of blocks. In such conventional pneumatic tires, the small sipes remove the water films generated between the road surface and the tread surface, thus achieving excellent turning performance on icy road surfaces and snow covered road surfaces (see, for example, Japanese Patent No. 3702958).

In pneumatic tires for icy and snowy roads, shoulder land portions located in its tire-width-direction outermost parts are deformed due to the load applied across the tire width direction when the vehicle turns. This brings the side surfaces of the land portions into contact with the road surface. To achieve turning performance, it is demanded to remove the water films generated between the road surface and the side surfaces of the land portions.

SUMMARY OF THE INVENTION

It is an object of the present invention to at least partially solve the problems in the conventional technology.

A pneumatic tire according to an aspect of the present invention includes a tread that includes land portions formed and segmented by a plurality of circumferential grooves extending in a tire circumferential direction and by a plurality of widthwise grooves extending in a tire width direction, sipes being formed in contact patches of the land portions; recessed sections or raised sections that are formed in tire-width-direction lateral surfaces of the land portions provided in tire-width-direction outermost parts so as to connect to the widthwise grooves; and first indents/lugs that are provided in bottom surfaces of the recessed sections, in upper surfaces of the raised sections, or in the tire-width-direction lateral surfaces of the land portions such that indents/lugs thereof are arranged alternately and continuously in a linear manner.

In the pneumatic tire, the recessed sections may each have a recess depth d set in a range of 0.3 millimeter≤d≤3.0 millimeters, relative to the tire-width direction lateral surfaces of the land portions, the raised sections may each have a raise height h set in a range of 0.3 millimeter≤h≤3.0 millimeters, relative to the tire-width-direction lateral surfaces of the land portions, and the first indents/lugs may each have: a difference di set in a range of 0.1 millimeter≤di≤2.0 millimeters between the tire-width-direction lateral surfaces of the land portions and the indents or lugs, a pitch s of the lugs set in a range of 0.3 millimeter≤p≤3.0 millimeters; and a width s of the indents set in a range of 0.1 millimeter≤s≤1.5 millimeters.

In the pneumatic tire, the recessed sections may be formed so as to border the contact patches of the land portions provided in the tire-width-direction outermost parts.

The pneumatic tire may further include second indents/lugs in the contact patches of the land portions in the tire-width-direction outermost parts. The second indents/lugs may be communicated with the first indents/lugs that are formed in the bottom surfaces of the recessed sections formed to border the contact patches of the land portions, or in the tire-width-direction lateral surfaces of the land portions.

In the pneumatic tire, the first indents/lugs, formed in the bottom surfaces of the recessed sections, in the upper surfaces of the raised sections, or in the tire-width-direction lateral surfaces of the land portions, may be formed at a distance from an outer periphery of such surfaces on which the first indents/lugs are formed.

In the pneumatic tire, the recessed sections or the raised sections may be formed to extend, and inclined with respect to the normal to the tire circumferential direction.

In the pneumatic tire, the recessed sections or the raised sections may have an inclination angle θ set in a range of 5 degrees≤θ≤60 degrees, with respect to a tangent line in the tire circumferential direction.

In the pneumatic tire, the recessed sections or the raised sections each may be formed to have an acute-angle end oriented in a tire rotational direction.

In the pneumatic tire, the first indents/lugs, formed in the bottom surfaces of the recessed sections, in the upper surfaces of the raised sections, or in the tire-width-direction lateral surfaces of the land portions, may have an angle α set in a range of 0 degrees≤α≤60 degrees, with respect to a tire radial direction.

In the pneumatic tire, the sipes may be formed in a zigzag shape for use on an icy and snowy road.

A tire mold according to another aspect of the present invention includes a tread molding section with which the tread of the pneumatic tire according to the invention is shaped.

A method of manufacturing a pneumatic tire, according to still another aspect of the present invention, includes forming a green tire; fitting the green tire to the tire mold according to the invention; attaching the green tire to the tire mold, while enlarging the green tire outwardly in a tire radial direction; and heating the green tire so that vulcanization takes place.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 16 is a table depicting results of performance tests of pneumatic tires according to examples of the present invention.

DETAILED DESCRIPTION OF THE PREFERRED EMBODIMENTS

Exemplary embodiments of a pneumatic tire, a tire mold, and a method of manufacturing a pneumatic tire according to the present invention are described below with reference to the accompanying drawings. The present invention is not limited to the embodiments. Constituting elements of the embodiments include elements convertible by a person skilled in the art, or elements being substantially the same as those. A plurality of modifications described in the embodiments can be combined arbitrary within the scope of obviousness for a person skilled in the art.

Figure 1:
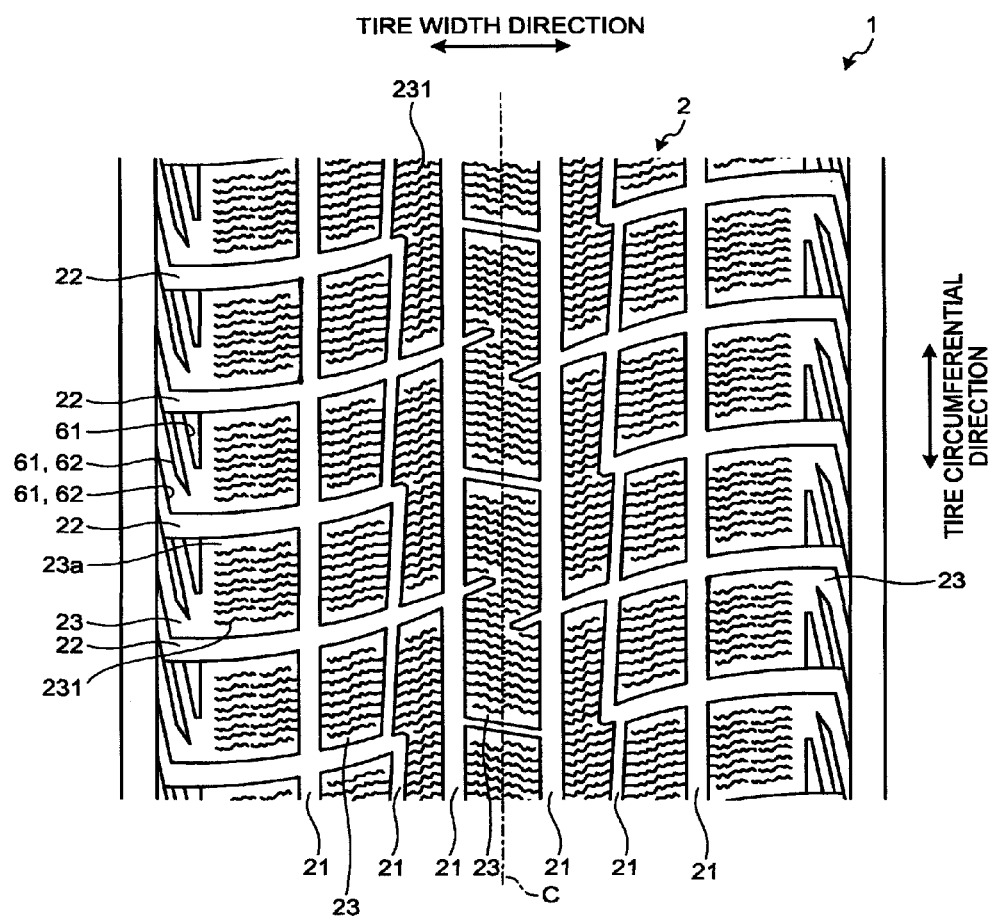
FIG. 1 is a partial plan view of a tread of a pneumatic tire according to an embodiment of the present invention.
Figure 2:
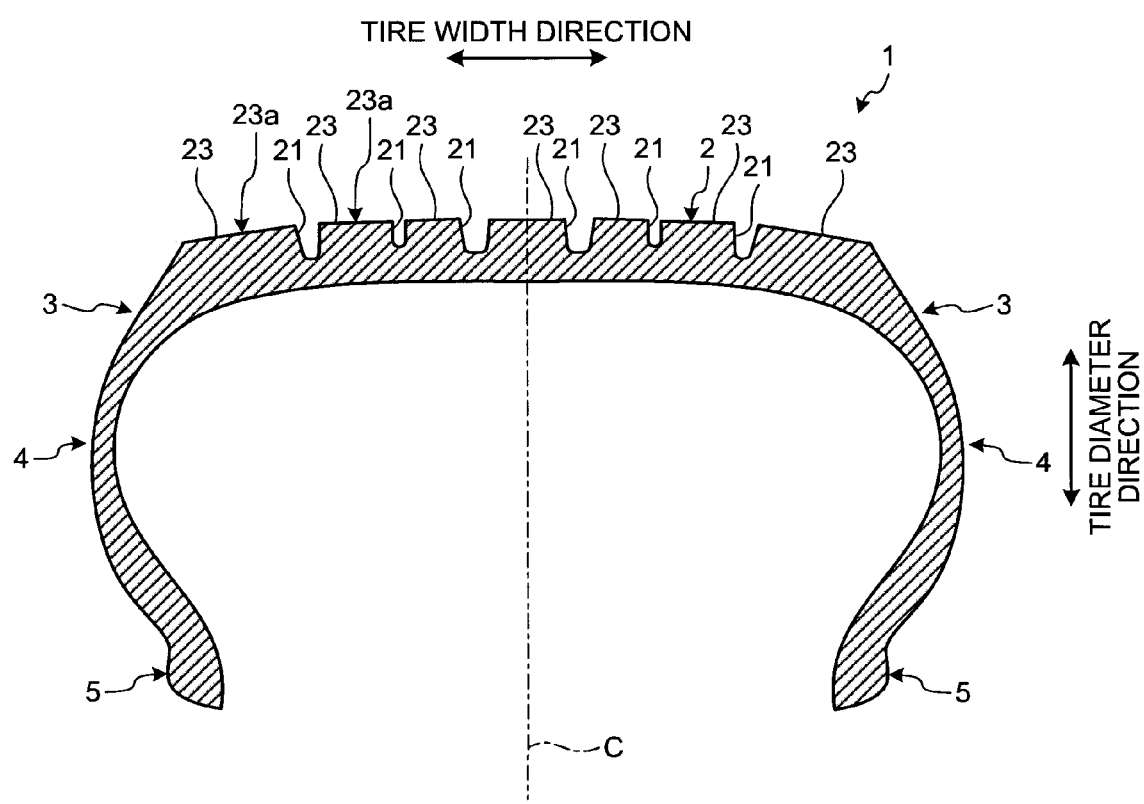
FIG. 2 is a meridional cross section of the pneumatic tire shown in FIG. 1.
Figure 3:
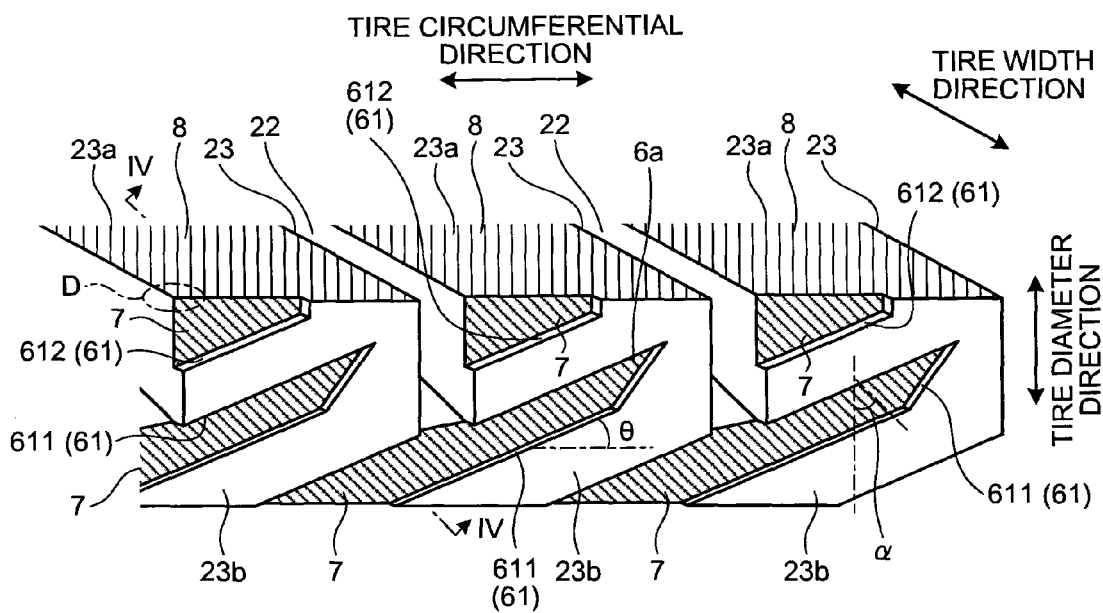
FIG. 3 is a partial enlarged perspective view of the tread of the pneumatic tire shown in FIG. 1.
Figure 4:
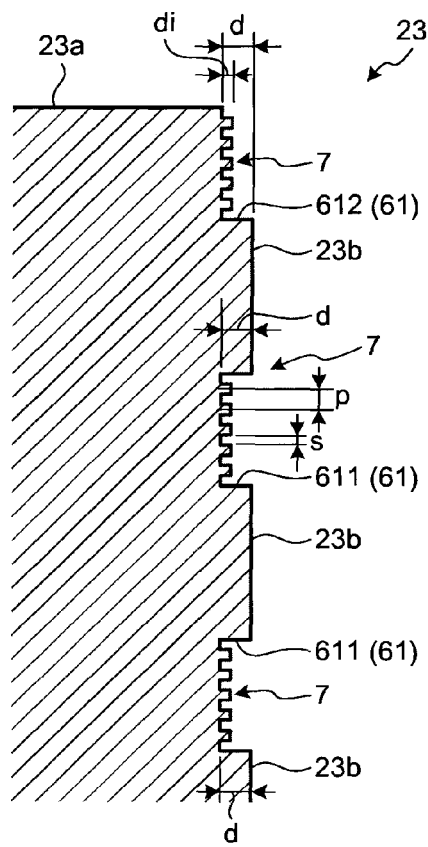
FIG. 4 is an enlarged end view taken along IV-IV of FIG. 3.
Figure 5:
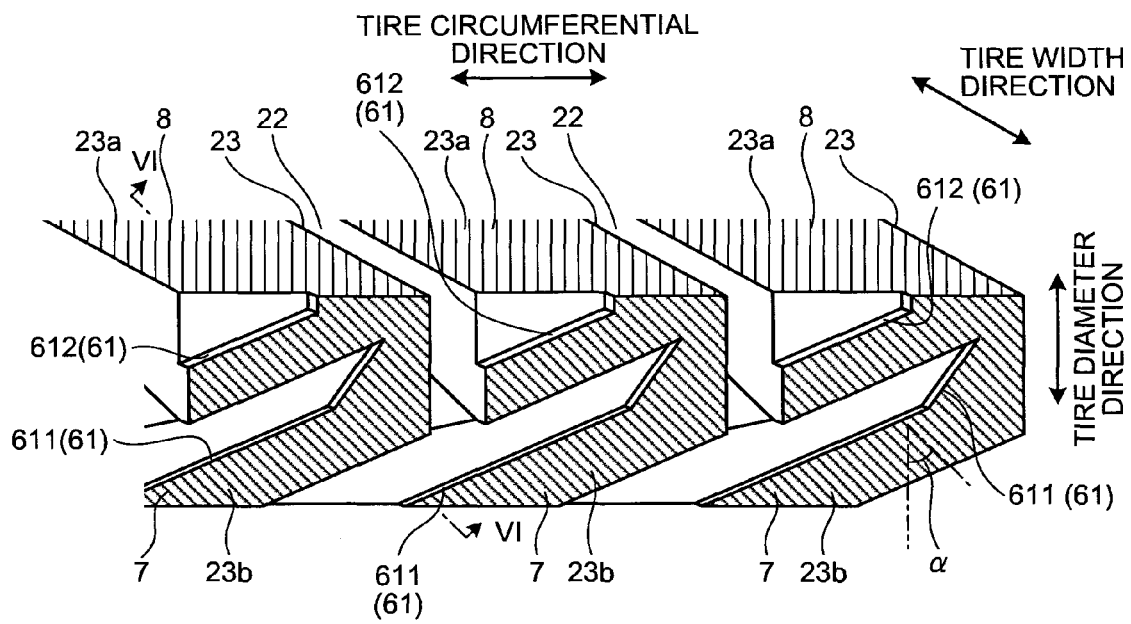
FIG. 5 is a partial enlarged perspective view of the tread of the pneumatic tire shown in FIG. 1.
Figure 6:
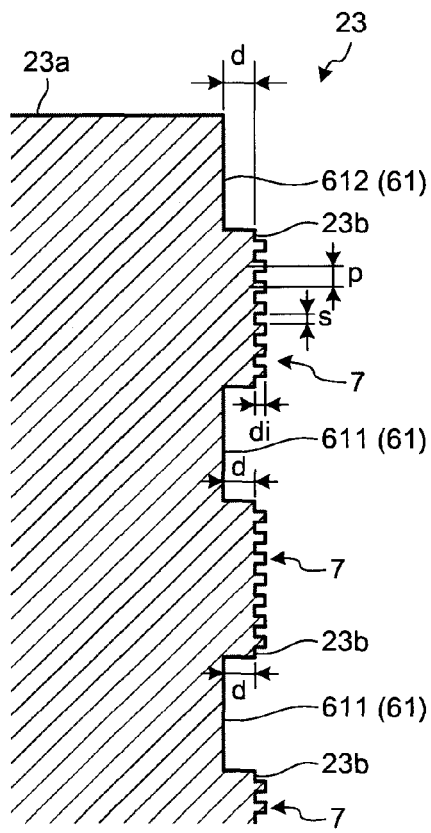
FIG. 6 is an enlarged end view taken along VI-VI of FIG. 5.
Figure 7:
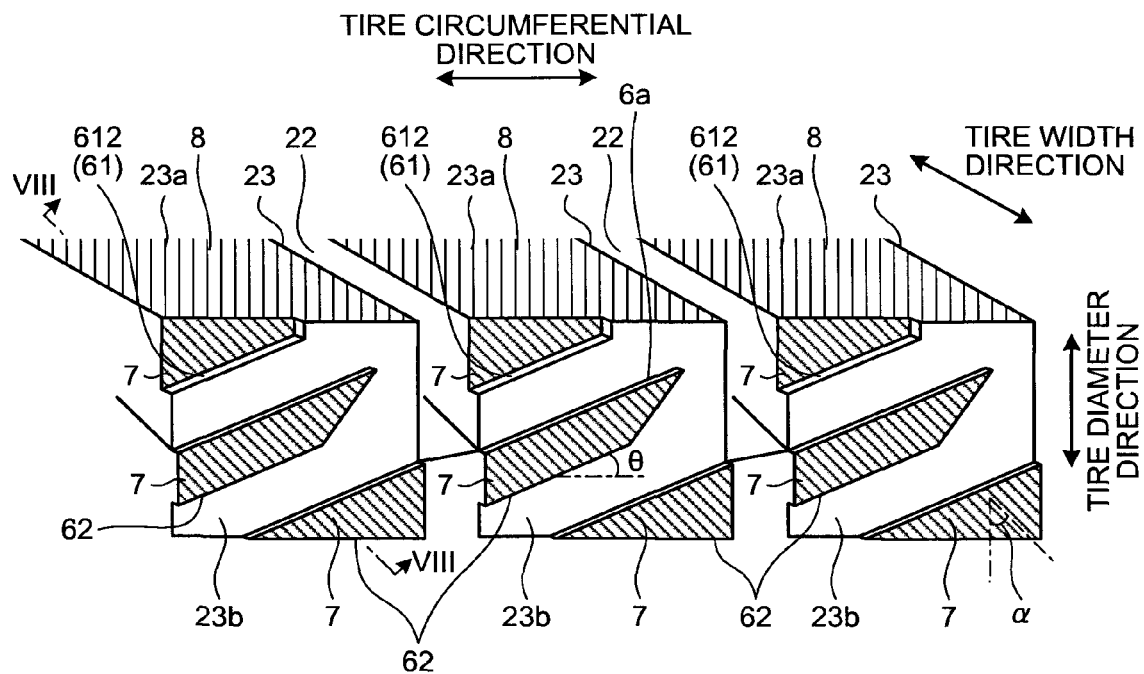
FIG. 7 is a partial enlarged perspective view of the tread of the pneumatic tire shown in FIG. 1.
Figure 8:
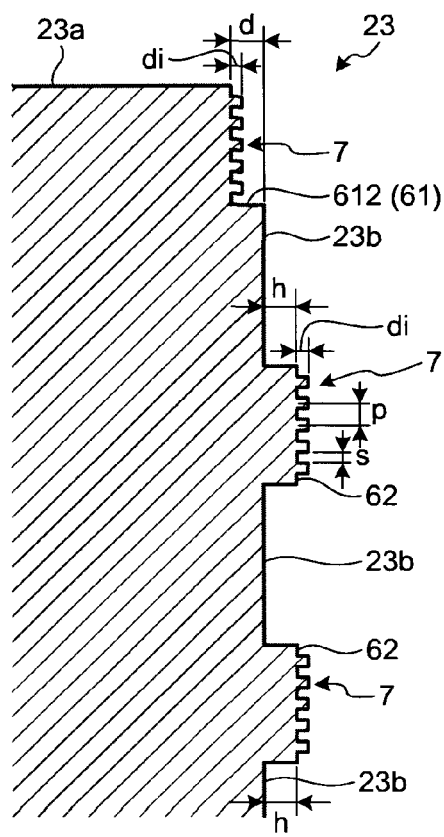
FIG. 8 is an enlarged end view taken along VIII-VIII of FIG. 7.
Figure 9:
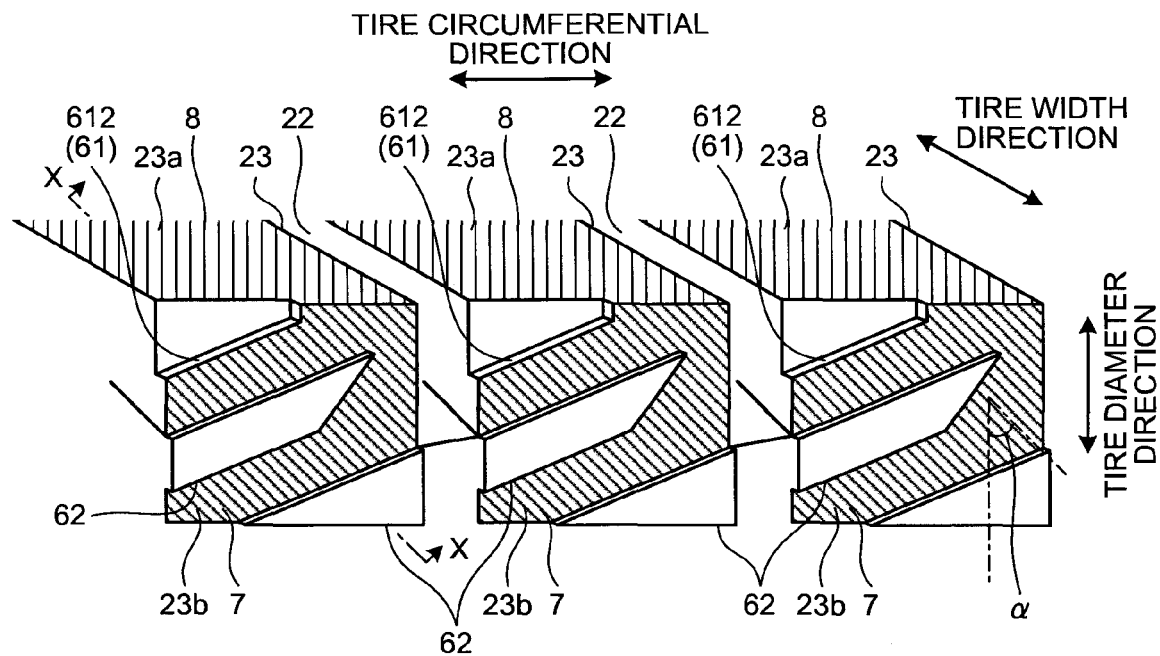
FIG. 9 is a partial enlarged perspective view of the tread of the pneumatic tire shown in FIG. 1.
Figure 10:
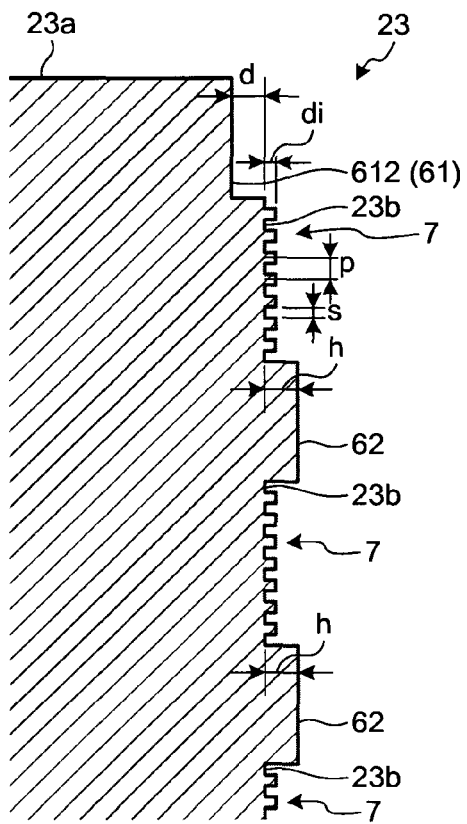
FIG. 10 is an enlarged end view taken along X-X of FIG. 9.
Figure 11:
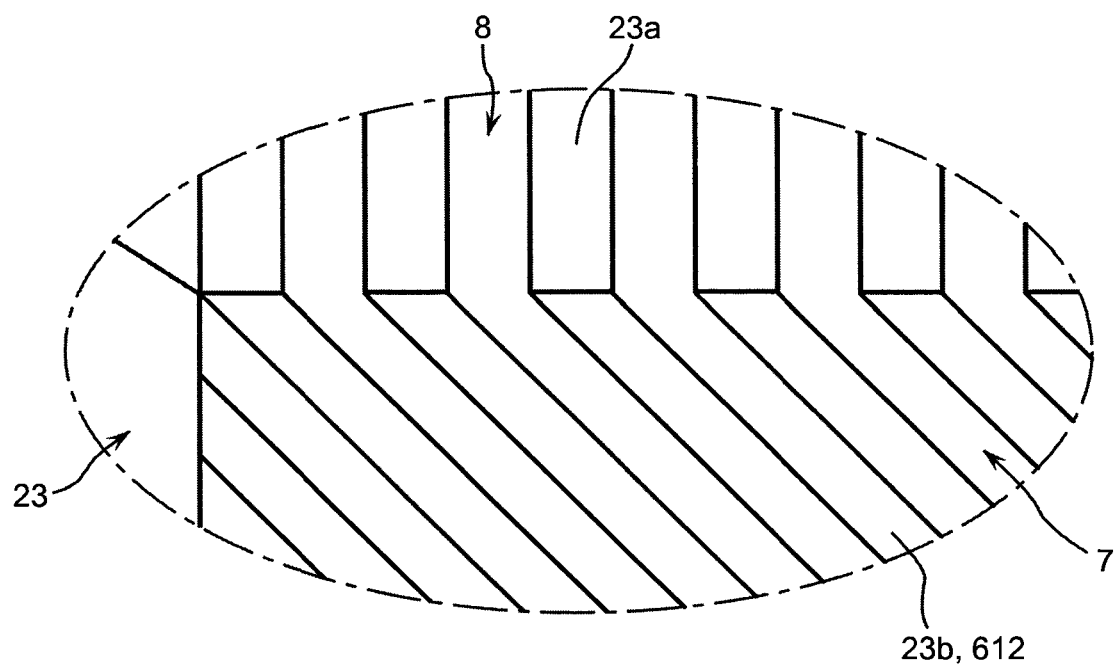
FIG. 11 is an enlarged view of a D part shown in FIG. 3.

FIG. 1 is a partial plan view of a tread of a pneumatic tire according to an embodiment of the present invention. FIG. 2 is a meridional cross section of the pneumatic tire shown in FIG. 1. FIG. 3 is a partial enlarged perspective view of the tread of the pneumatic tire shown in FIG. 1. FIG. 4 is an enlarged end view taken along IV-IV of FIG. 3. FIG. 5 is a partial enlarged perspective view of the tread of the pneumatic tire shown in FIG. 1. FIG. 6 is an enlarged end view taken along VI-VI of FIG. 5. FIG. 7 is a partial enlarged perspective view of the tread of the pneumatic tire shown in FIG. 1. FIG. 8 is an enlarged end view taken along VIII-VIII of FIG. 7. FIG. 9 is a partial enlarged perspective view of the tread of the pneumatic tire shown in FIG. 1. FIG. 10 is an enlarged end view taken along X-X of FIG. 9. FIG. 11 is an enlarged view of a D part shown in FIG. 3. FIGS. 12 to 15 are partial enlarged perspective views of the tread of the pneumatic tire shown in FIG. 1. FIG. 16 is a table depicting results of performance tests of pneumatic tires according to examples of the present invention.

A tire width direction as used herein means a direction parallel to a rotation axis (not shown) of a pneumatic tire 1. An inner side in the tire width direction as used herein means a portion being closer to a tire equatorial plane C in the tire width direction, and an outer side in the tire width direction as used herein means a portion being away from the tire equatorial plane C in the tire width direction. A tire radial direction as used herein means a direction orthogonal to the rotation axis. An inner side in the tire radial direction as used herein means a portion being closer to the rotation axis in the tire radial direction, and an outer side in the tire radial direction as used herein means a portion being away from the rotation axis in the tire radial direction. A tire circumferential direction as used herein means a circumferential direction around the rotation axis serving as a central axis. The tire equatorial plane C as used herein means a plane being orthogonal to the rotation axis of the pneumatic tire 1 and passing the center in the tire width of the pneumatic tire 1. A tire equator line as used herein means a line being on the tire equatorial plane C and extends along the circumferential direction of the pneumatic tire.

The pneumatic tire 1 according to the present embodiment is a pneumatic radial tire, such as a winter tire used on icy and snowy roads or an all-season tire, and includes a tread 2.

As shown in FIG. 1, the tread 2 is made of a rubber material and exposed outside the pneumatic tire 1, and its surface contours the pneumatic tire 1. In the tread 2 are provided a plurality of circumferential grooves 21 extending in the tire circumferential direction, a plurality of widthwise grooves 22 extending in the tire width direction, and land portions 23 segmented by the circumferential grooves 21 and the widthwise grooves 22. In surfaces of the land portions 23, i.e., contact patches 23a to be brought into contact with the road surface during running, are formed a plurality of sipes 231 of small grooves. The sipes 231 produce an edge effect by biting the icy and snowy road surface, so as to provide a grip on the land portions 23. This is for effecting braking performance and handling stability on the icy and snowy road surface. In the present embodiment, the sipes 231 are formed in a zigzag shape for use on icy and snowy roads. The sipes 231 are not limited to the zigzag shape, and may be formed to extend in the tire width direction in a linear manner, though not shown.

As shown in FIG. 2, in the both outer sides of the tread 2 in the tire width direction are located shoulders 3. In the inner side of the shoulders 3 in the tire radial direction are located sidewalls 4 that are exposed in the outermost parts of the pneumatic tire 1 in the tire width direction. In the inner side of the sidewalls 4 in the tire radial direction are located beads 5 fitted to a rim (not shown). Inside the pneumatic tire 1, a carcass forming a structure of the tire is spanned so as to form a toroidal shape across the tread 2 to the beads 5, though not shown. In an outer circumference of the carcass of the tread 2 is provided a reinforcing belt.

In the pneumatic tire 1, tire-width-direction lateral surfaces 23b of the land portions 23, provided in the tire-width-direction outermost parts (in the shoulders 3), include recessed sections 61 or raised sections 62 that are formed to connect to inner surfaces of the widthwise grooves 22.

The recessed sections 61 include groove-bottom recessed sections 611 bordering groove-bottoms of the widthwise grooves 22; and groove-top recessed sections 612 bordering tread-openings of the widthwise grooves 22. As shown in FIGS. 3 to 6, the groove-bottom recessed sections 611 are provided so as to border part of the groove-bottoms of the widthwise grooves 22 and extend across two of the land portions 23 adjoining each other in the tire circumferential direction with each widthwise groove 22 in between. On the contrary, as shown in FIGS. 3 to 10, the groove-top recessed sections 612 are formed so as to border part of the openings of the widthwise grooves 22 and also border part of the contact patches 23a of the land portions 23 in the tire-width-direction outermost parts.

As shown in FIGS. 7 to 10, the raised sections 62 are provided so as to border the groove-bottoms of the widthwise grooves 22 and extend across two of the land portions 23 adjoining each other in the tire circumferential direction with each widthwise grooves 22 in between, as in the groove-bottom recessed sections 611.

In bottom surfaces of the recessed sections 61 (the groove-bottom recessed sections 611, the groove-top recessed sections 612), in upper surfaces of the raised sections 62, or in the tire-width-direction lateral surfaces 23b of the land portions 23 are formed indents/lugs 7. The indents/lugs 7 are provided so as to have either indents or lugs relative to such surfaces. These indents/lugs are formed alternately and continuously. The indents/lugs 7 are continued in a direction inclined with respect to the tire radial direction. FIGS. 4, 6, 8, and 10 depict the indents/lugs 7 having lugs from the surfaces.

FIGS. 3 and 4 depict the indents/lugs 7 formed in the bottom surfaces of the recessed sections 61 (the groove-bottom recessed sections 611, the groove-top recessed sections 612). FIGS. 7 and 8 depict the indents/lugs 7 formed in the bottom surfaces of the recessed sections 61 (the groove-top recessed sections 612) and in the upper surfaces of the raised sections 62. FIGS. 5 and 6 depict the indents/lugs 7 formed in the tire-width-direction lateral surfaces 23b of the land portions 23, with the recessed sections 61 (the groove-bottom recessed sections 611, the groove-top recessed sections 612) provided. Further, FIGS. 9 and 10 depict the indents/lugs 7 formed in the tire-width-direction lateral surfaces 23b of the land portions 23, with the recessed sections 61 (the groove-top recessed sections 612) and the raised sections 62 provided.

In the pneumatic tire 1, the land portions 23 in the tire-width-direction outermost parts are deformed due to the load applied across the tire width direction when the vehicle turns, and the tire-width-direction lateral surfaces 23b of the land portions 23 are brought into contact with the road surface. Accordingly, the recessed sections 61 (the groove-bottom recessed sections 611, the groove-top recessed sections 612), the raised sections 62, and the indents/lugs 7, all provided in the tire-width-direction lateral surfaces 23b, remove the water films generated between the road surface and the tire-width-direction lateral surfaces 23b. Specifically, the recessed sections 61 (the groove-bottom recessed sections 611, the groove-top recessed sections 612) and the raised sections 62 are provided to connect to the widthwise grooves 22. Because the water residing between the road surface and the tire-width-direction lateral surfaces 23b is discharged to the widthwise grooves 22, the water films can be removed easily and quickly. Further, the indents/lugs 7 provide an increased surface area to be in contact with the water, thus efficiently removing the water films. This improves the braking performance and handling stability when the vehicle turns on icy and snowy roads.

In the pneumatic tire 1 according to the present embodiment, as shown in FIGS. 4, 6, 8, and 10, each of the recessed sections 61 (the groove-bottom recessed sections 611, the groove-top recessed sections 612) has a recess depth d set in a range of 0.3 [millimeter]≤d≤3.0 [millimeters] relative to the tire-width-direction lateral surfaces 23b of the land portions 23. As shown in FIGS. 8 and 10, each of the raised sections 62 has a raise height h set in a range of 0.3 [millimeter]≤h≤3.0 [millimeters] relative to the tire-width-direction lateral surfaces 23b of the land portions 23. As shown in FIGS. 4, 6, 8, and 10, each of the indents/lugs 7 has: a difference di set in a range of 0.1 [millimeter]≤di≤2.0 [millimeters] between the tire-width-direction lateral surfaces 23b of the land portions 23 and the indents or the lugs; a pitch p of the lugs set in a range of 0.3 [millimeter]≤p≤3.0 [millimeters]; and a width s of the indents set in a range of 0.1 [millimeter]≤s≤1.5 [millimeters]. The pitch p of the lugs is a distance between the center points of adjoining lugs with each indent in between.

According to the above arrangement, when the depth d of the recessed sections 61 (the groove-bottom recessed sections 611, the groove-top recessed sections 612) or the height h of the raised sections 62 is less than 0.3 [millimeter], the drainage effect is reduced. On the contrary, when the depth d of the recessed sections 61 (the groove-bottom recessed sections 611, the groove-top recessed sections 612) or the height h of the raised sections 62 exceeds 3.0 [millimeters], the stiffness of the tread 2 is reduced, degrading the handling stability. Further, when the difference di in the indents/lugs 7 is less than 0.1 [millimeter], the pitch p of the lugs exceeds 3.0 [millimeters], and the width s of the indents exceeds 1.5 [millimeters], the drainage effect is reduced. On the contrary, when the difference di in the indents/lugs 7 exceeds 2.0 [millimeters], a mold lubricant (such as silicone) easily gets into the indents/lugs 7. Accordingly, the mold lubricant degrades braking performance and handling stability in the early use stage of the pneumatic tire 1, though it facilitates removal of the pneumatic tire from a tire mold during the manufacture. For these reasons, by defining the depth d of the recessed sections 61 (the groove-bottom recessed sections 611, the groove-top recessed sections 612), the height h of the raised sections 62, the difference di in the indents/lugs 7, the pitch p of the lugs, and the width s of the indents, the turning performance on icy roads and snowy roads is improved.

The depth d of the recessed sections 61 (the groove-bottom recessed sections 611, the groove-top recessed sections 612) relative to the tire-width-direction lateral surfaces 23b of the land portions 23 is preferably set in a range of 0.3 [millimeter]≤d ≤2.0 [millimeters]. The raise height h of the raised sections 62 relative to the tire-width-direction lateral surfaces 23b of the land portions 23 is preferably set in a range of 0.3 [millimeter]≤h≤2.0 [millimeters]. In the indents/lugs 7, the difference di between the tire-width-direction lateral surfaces 23b of the land portions 23 and the indents or the lugs is preferably set in a range of 0.1 [millimeter]≤di≤0.4 [millimeter], the pitch p of the lugs is preferably set in a range of 0.5 [millimeter]≤p≤1.5 [millimeters], and the width s of the indents is preferably set in a range of 0.2 [millimeter]≤s≤0.8 [millimeter]. As such, by defining the depth d of the recessed sections 61 (the groove-bottom recessed sections 611, the groove-top recessed sections 612); the height h of the raised sections 62; and the difference di, the pitch p of the lugs, and the width s of the indents in the indents/lugs 7 to fall in the preferable ranges, the turning performance on icy roads and snowy roads is further improved.

In the pneumatic tire 1 according to the present embodiment, the groove-top recessed sections 612, which border part of the contact patches 23a of the land portions 23 in the tire-width-direction outermost parts, are provided as the recessed sections 61 as described above.

According to the above arrangement, the groove-top recessed sections 612 provide the edge effect. This further improves the turning performance on icy roads and snowy roads.

In the pneumatic tire 1 according to the present embodiment, indents/lugs 8 are formed in the contact patches 23a of the land portions 23 in the tire-width-direction outermost parts as shown in FIGS. 3, 5, 7, and 9. The indents/lugs 8 are provided to have either indents or lugs relative to the surfaces, as in the indents/lugs 7. The indents and the lugs are formed alternately and continuously. The indents/lugs 8 have: a difference set in a range of not less than 0.1 [millimeter] and not more than 2.0 [millimeters] between the contact patches 23a of the land portions 23 and the indents or lugs; a pitch of the lugs set in a range of not less than 0.3 [millimeter] and not more than 3.0 [millimeters] (preferably not less than 0.5 [millimeter] and not more than 1.5 [millimeters]); and a width of the indents set in a range of not less than 0.1 [millimeter] and not more than 1.5 [millimeters] (preferably not less than 0.2 [millimeter] and not more than 0.8 [millimeter]). The indents/lugs 8 continue in a direction inclined with respect to the tire width direction.

As shown in FIG. 10, the indents/lugs 8 are communicated with the indents/lugs 7 formed in the bottom surfaces of the recessed sections 61 (the groove-top recessed sections 612) or in the tire-width-direction lateral surfaces 23b of the land portions 23. Specifically, the indents in the indents/lugs 8 are communicated with the indents in the indents/lugs 7, and the lugs in the indents/lugs 8 are communicated with the lugs in the indents/lugs 7.

According to the above arrangement, the indents/lugs 7 are communicated with the indents/lugs 8 in the contact patches 23*a* of the land portions 23. Because the water residing between the road surface and the tire-width-direction lateral surfaces 23*b*, both to be in contact when the vehicle turns, are discharged to the indents/lugs 8, the water films can be removed easily and quickly. This further improves the turning performance on icy roads and snowy roads.

Figure 12:
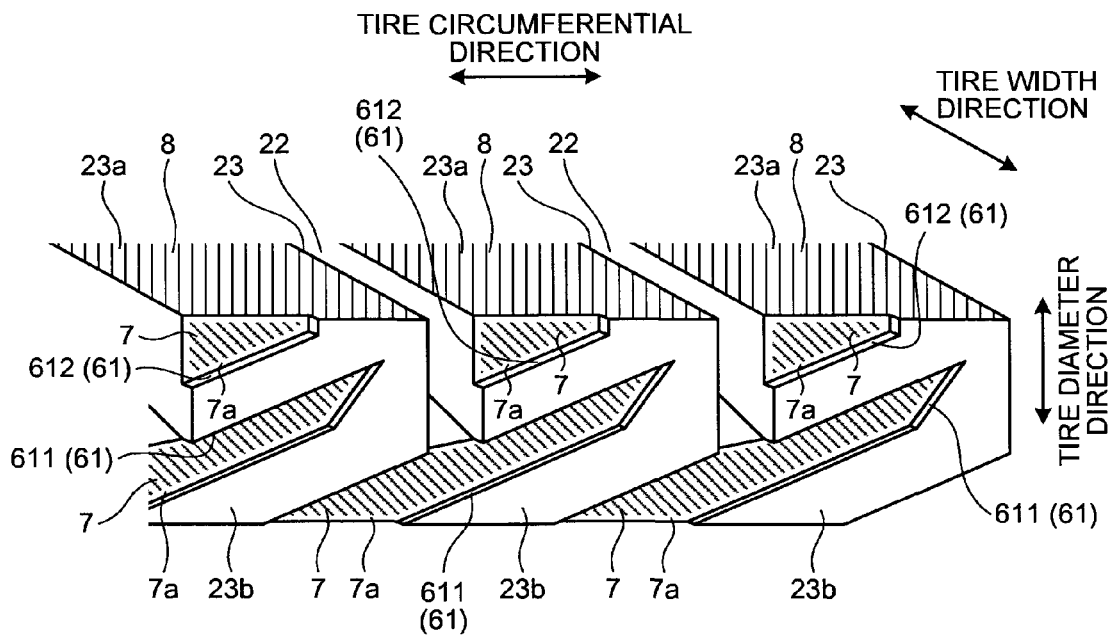
FIG. 12 is a partial enlarged perspective view of the tread of the pneumatic tire shown in FIG. 1.
Figure 13:
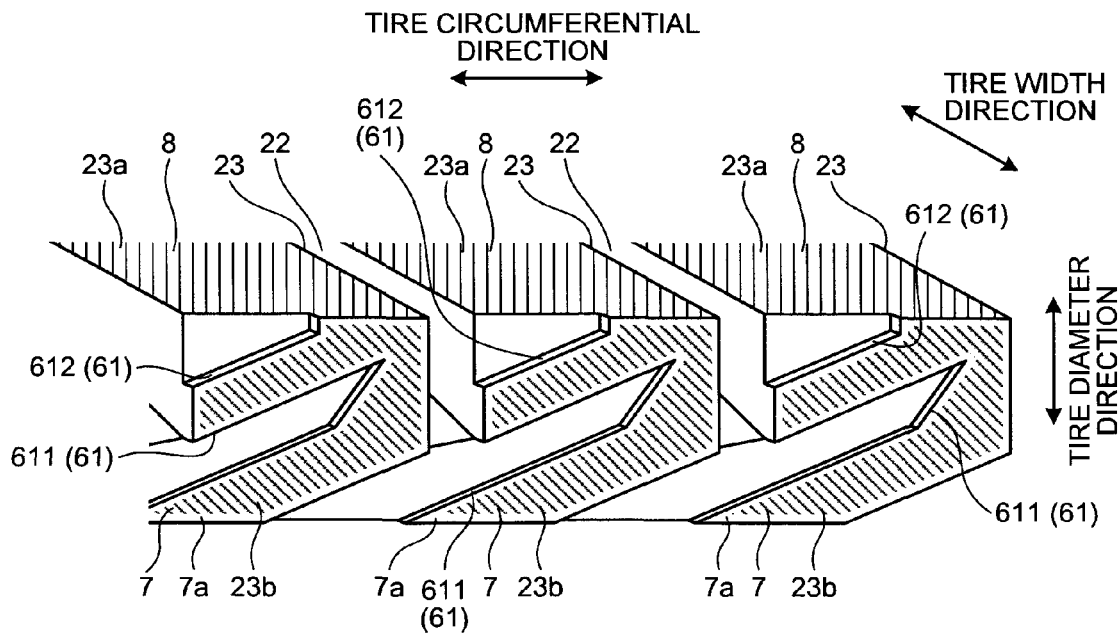
FIG. 13 is a partial enlarged perspective view of the tread of the pneumatic tire shown in FIG. 1.
Figure 14:
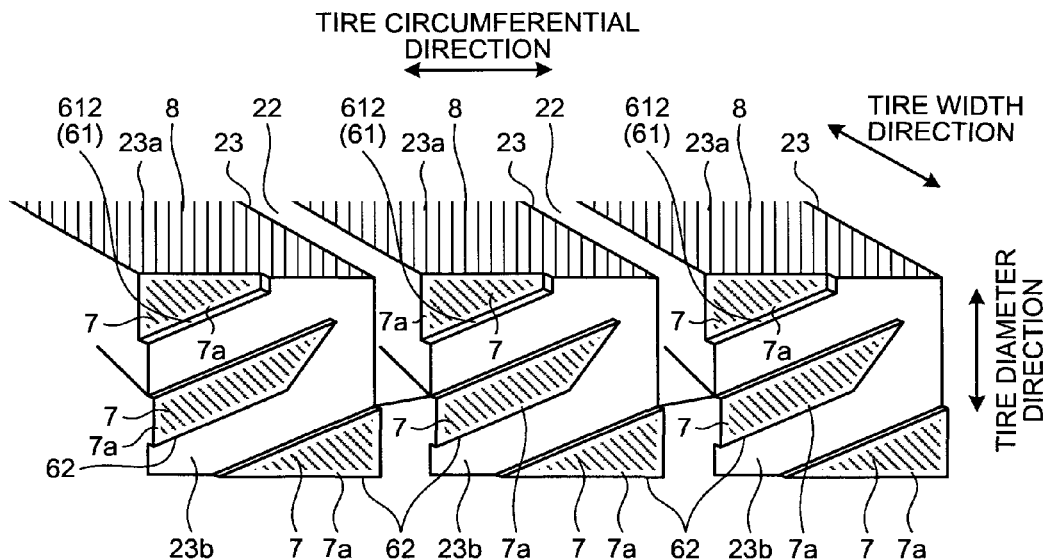
FIG. 14 is a partial enlarged perspective view of the tread of the pneumatic tire shown in FIG. 1.
Figure 15:
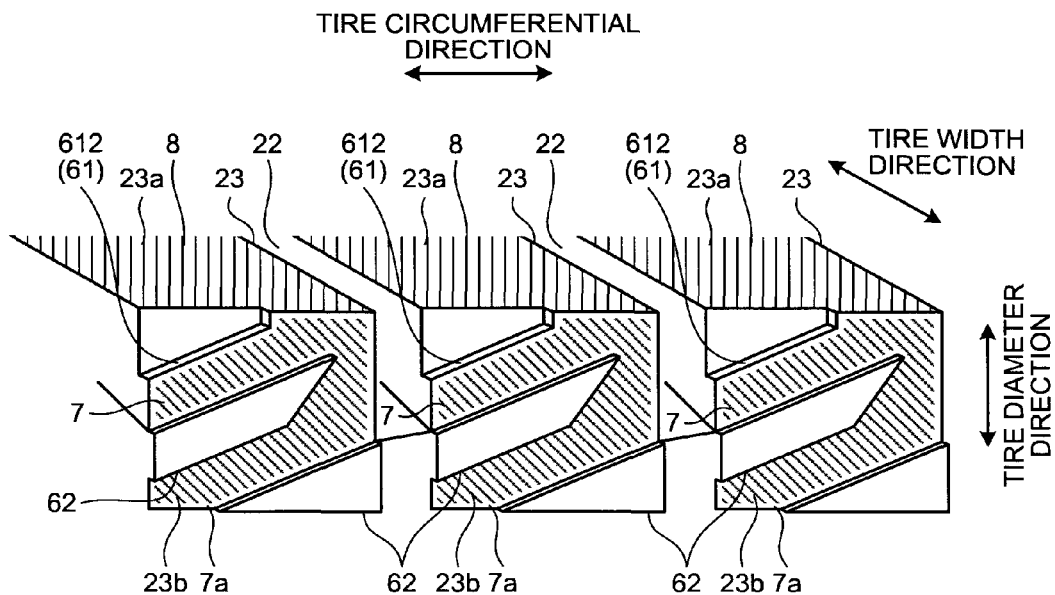
FIG. 15 is a partial enlarged perspective view of the tread of the pneumatic tire shown in FIG. 1.

In the pneumatic tire 1 according to the present embodiment, the indents/lugs 7 are formed at a distance from an outer periphery of the surfaces on which they are formed. Specifically, flat portions 7*a* are provided along the outer periphery of the surfaces on which the indents/lugs 7 are formed (see FIGS. 12 to 15). In FIG. 12, the indents/lugs 7 are formed in the bottom surfaces of the recessed sections 61 (the groove-bottom recessed sections 611, the groove-top recessed sections 612), and the flat portions 7*a* are provided along the outer periphery of the bottom surfaces of the recessed sections 61. In FIG. 13, the indents/lugs 7 are formed in the tire-width-direction lateral surfaces 23*b* of the land portions 23 while the recessed sections 61 (the groove-bottom recessed sections 611, the groove-top recessed sections 612) are provided. The flat portions 7*a* are provided along the outer periphery of the tire-width-direction lateral surfaces 23*b*. In FIG. 14, the indents/lugs 7 are formed in the bottom surfaces of the recessed sections 61 (the groove-top recessed sections 612) and in the upper surfaces of the raised sections 62, and the flat portions 7*a* are provided along the outer periphery of the bottom surfaces and the upper surfaces. In FIG. 15, the indents/lugs 7 are formed in the tire-width-direction lateral surfaces 23*b* of the land portions 23 while the recessed sections 61 (the groove-top recessed sections 612) and the raised sections 62 are provided. The flat portions 7*a* are provided along the outer periphery of the tire-width-direction lateral surfaces 23*b*.

The above arrangement prevents reduction in stiffness at portions where the indents/lugs 7 are formed, also preventing cracking of edges of the indents/lugs 7.

In the pneumatic tire 1 according to the present embodiment, the recessed sections 61 (the groove-bottom recessed sections 611) or the raised sections 62 are formed to extend, and inclined with respect to the normal to the tire circumferential direction (see FIGS. 3 and 7).

According to the above arrangement, the recessed sections 61 (the groove-bottom recessed sections 611) or the raised sections 62 are inclined with respect to the normal to the tire circumferential direction, at an angle with a rotational direction of the pneumatic tire 1. This provides the edge effect, thus further improving the turning performance on icy roads and snowy roads. The inclination with respect to the normal to the tire circumferential direction may be made such that ends 6*a* of the recessed sections 61 (the groove-bottom recessed sections 611) or of the raised sections 62 are oriented to either the outer side or the inner side in the tire radial direction.

The inclination angle θ of the recessed sections 61 (the groove-bottom recessed sections 611) or of the raised sections 62 relative to the tangent line in the tire circumferential direction is preferably set in a range of 5 [degrees]≤θ≤60 [degrees]. By setting the inclination angle θ within this range, the water residing between the road surface and the tire-width-direction lateral surfaces 23*b*, both to be in contact when the vehicle turns, can be discharged to the widthwise grooves 22 efficiently. Further, the inclination angle θ is preferably set in a range of 15 [degrees]≤θ≤30 [degrees] for efficiently discharging the water residing between the road surface and the tire-width-direction lateral surfaces 23*b*, both to be in contact when the vehicle turns, to the widthwise grooves 22.

In the pneumatic tire 1 according to the present embodiment, the recessed sections 61 (the groove-bottom recessed sections 611) or the raised sections 62 are formed to have the acute-angle ends 6*a* oriented in the rotational direction of the tire (see FIGS. 3 and 7).

According to the above arrangement, the sharp angle of the ends 6*a* increases the edge effect. This further improves the turning performance on icy roads and snowy roads.

In the pneumatic tire 1 according to the present embodiment, the indents/lugs 7 have an angle α set in a range of 0 [degrees]≤α≤60 [degrees], with respect to the tire radial direction as shown in FIGS. 3, 5, 7, and 9.

According to the above arrangement, by defining the angle α of the indents/lugs 7 with respect to the tire radial direction, the water residing between the road surface and the tire-width-direction lateral surfaces can be discharged efficiently. This further improves the turning performance on icy roads and snowy roads. Further, by defining the angle α with respect to the tire radial direction, the rubber is desirably flowed inside a mold when the pneumatic tire 1 is molded. This reduces the manufacturing defects, thus improving productivity of the pneumatic tire having excellent turning performance on icy roads and snowy roads.

The pneumatic tire 1 according to the present embodiment is molded in a tire mold including a tread molding section with which the tread 2 can be shaped (see FIGS. 1 to 15). With the tire mold, the tread molding section, with which the recessed sections 61 (the groove-bottom recessed sections 611, the groove-top recessed sections 612), the raised sections 62, the indents/lugs 7, and the indents/lugs 8 are shaped, enables desirable flow of rubber. This reduces manufacturing defects. Further, because the rubber is flowed desirably, vent holes are reduced, so that operations for removing root-like portions formed due to the vent holes are reduced. This improves productivity of the pneumatic tire 1 having excellent turning performance on icy roads and snowy roads.

According to a method of manufacturing the pneumatic tire 1, a green tire (a raw tire) is formed in a forming machine (not shown) using materials for the carcass, the belt, the tread, the shoulders, the sidewalls, and the beads. Then, the green tire is fitted to a tire mold including a tread molding section with which the tread 2 can be shaped. The green tire is brought into contact with the tire mold while being enlarged outwardly in the tire radial direction. The green tire is heated, so that rubber molecules and sulfur molecules in the tread are combined and vulcanization takes place. During the vulcanization, the tread portion of the green tire conforms to the shape of the tire mold, so that the tread 2 of the pneumatic tire 1 is formed. Finally, the molded pneumatic tire 1 is taken out from the tire mold.

The method of manufacturing the pneumatic tire 1 enables manufacture of the pneumatic tire 1 having excellent turning performance on icy roads and snowy roads.

In the pneumatic tire 1 according to the present embodiment, the recessed sections 61 (opening recessed sections 612) and the raised sections 62 are provided such that steps are formed across the opening recessed sections 612 and the tire-width-direction lateral surfaces 23*b* up to the raised sections 62 and that the steps are gradually increased as being away from the tire-width-direction lateral surfaces 23*b*, as shown in FIGS. 7 to 10, 14, and 15. According to this arrangement, the steps increase the edge effect, thus further improving the turning performance on icy roads and snowy roads.

According to the present embodiment, performance tests were conducted on the turning performance on icy roads and snowy roads, using pneumatic tires of a plurality of kinds with different conditions (see FIG. 16).

The performance tests were conducted by attaching pneumatic tires of a tire size 215/60R16 to normal rims, applying normal internal pressure and normal load, and then attaching the tires to a four-wheel test vehicle (2500 [cc], front engine rear drive (FR)). The normal rim refers to an "applicable rim" specified by the Japan automobile tyre manufacturers association, Inc. (JATMA), a "Design Rim" specified by the tire and rim association, Inc. (TRA), or a "Measuring Rim" specified by the European tyre and rim technical organization (ETRTO). The normal internal pressure refers to a "maximum air pressure" specified by JATMA, a maximum value of "TIRE LOAD LIMITS AT VARIOUS COLD INFLATION PRESSURES" specified by TRA, or an "INFLATION PRESSURES" specified by ETRTO. The normal load refers to a "maximum load capacity" specified by JATMA, a maximum value of "TIRE LOAD LIMITS AT VARIOUS COLD INFLATION PRESSURES" specified by TRA, or a "LOAD CAPACITY" specified by ETRTO.

As an evaluation method, the performance tests for the turning performance were conducted such that the test vehicle with the pneumatic tires attached were run on a circle with a radius of 30 [m], on both an icy road and a snowy road, the lap time was measured every time the vehicle ran one circle, and an average of the lap times measured for five circles was calculated for the icy road and the snowy road separately. Then, the measurement results were evaluated as indexed values, using a conventional example as a reference (100). Greater values are preferable in this evaluation.

The pneumatic tires of the conventional example have no recessed sections (groove-bottom recessed sections, groove-top recessed sections), no raised sections, or no indents/lugs. On the contrary, pneumatics tires of Example 1 include groove-bottom recessed sections or raised sections, and indents/lugs outside land portions, all made appropriately. Pneumatic tires of Example 2 include groove-top recessed sections in addition to the elements of Example 1. In pneumatic tires of Example 3, indents/lugs provided outside the land portions are communicated with indents/lugs provided in land contact patches, in addition to the elements of Example 2. In pneumatic tires of Example 4, indents/lugs outside the land portions are provided at a distance from the outer periphery of their surfaces, in addition to the elements of Example 3. In pneumatic tires of Example 5, the groove-bottom recessed sections or the raised sections are inclined, in addition to the elements of Example 4. In pneumatic tires of Example 6, the groove-bottom recessed sections or the raised sections have acute-angle ends, in addition to the elements of Example 5. The pneumatic tires of Examples 1 to 6 include the recessed sections (the groove-bottom recessed sections) or the raised sections that form an inclination angle θ set to 20 [degrees], with respect to the tangent line in the tire circumferential direction.

As seen from the test results shown in FIG. 16, the pneumatic tires of Examples 1 to 6 have excellent turning performance on the icy road and the snowy road.

A pneumatic tire according to an aspect of the present invention includes recessed sections or raised sections that are provided to connect to widthwise grooves. When the vehicle turns, the water residing between the road surface and tire-width-direction lateral surfaces of land portions is discharged to the widthwise grooves, so that the water films can be removed easily and quickly. Further, indents/lugs provide an increased surface area to be in contact with the water, thus efficiently removing the water films. This improves the turning performance on icy roads and snowy roads.

A tire mold according to another aspect of the present invention includes a tread molding section with which recessed sections, raised sections, indents/lugs are shaped. This allows the rubber to be flowed desirably, and therefore reduces manufacturing defects. Further, because the rubber is flowed desirably, vent holes are reduced, so that operations for removing root-like portions formed due to the vent holes are reduced. This improves productivity of a pneumatic tire having excellent turning performance on icy roads and snowy roads.

A method of manufacturing a pneumatic tire according to still another aspect of the present invention enables manufacture of a pneumatic tire having excellent turning performance on icy roads and snowy roads.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pneumatic tire comprising:
   a tread that includes land portions formed and segmented by a plurality of circumferential grooves extending in a tire circumferential direction and by a plurality of widthwise grooves extending in a tire width direction, sipes being formed in contact patches of the land portions;
   recessed sections and raised sections that are formed in outermost tire-width-direction lateral surfaces of land portions provided in tire-width-direction outermost parts so as to connect to the widthwise grooves;
   the outermost tire-width-direction lateral surface of each land portion provided in tire-width-direction outermost part constituting a level located at a height between one of the recessed sections and one of the raised sections adjacent each other;
   indents and lugs located on the level;
   each of the one of the recessed sections and the outermost tire-width-direction lateral surface extending inside from the contact patch of the land portion provided in tire-width-direction outermost part; and
   the outermost tire-width-direction lateral surface surrounding an end of the one of the raised sections such that part of the level having indents and lugs is located between the one of the recessed sections and the one of the raised sections and another part of the level having indents and lugs is located inside the one of the raised sections.

2. The pneumatic tire according to claim 1, wherein
   the recessed sections each have a recess depth d set in a range of 0.3 millimeter≤d≤3.0 millimeters, relative to the outermost tire-width direction lateral surfaces of the land portions,
   the raised sections each have a raise height h set in a range of 0.3 millimeter≤h≤3.0 millimeters, relative to the outermost tire-width-direction lateral surfaces of the land portions, and
   the indents and lugs each have: a difference di set in a range of 0.1 millimeter≤di≤2.0 millimeters between the outermost tire-width-direction lateral surfaces of the land portions and the indents or lugs, a pitch p of the lugs set in a range of 0.3 millimeter≤p≤3.0 millimeters; and a width s of the indents set in a range of 0.1 millimeter≤s≤1.5 millimeters.

3. The pneumatic tire according to claim 1, further comprising second indents and lugs in the contact patches of the land portions in the tire-width-direction outermost parts, wherein
the second indents and lugs are communicated with the indents and lugs that are formed in the outermost tire-width-direction lateral surfaces of the land portions.

4. The pneumatic tire according to claim 1, wherein the recessed sections and the raised sections are formed to extend, and inclined with respect to the normal to the tire circumferential direction.

5. The pneumatic tire according to claim 4, wherein the recessed sections and the raised sections have an inclination angle $\theta$ set in a range of 5 degrees$\leq\theta\leq$60 degrees, with respect to a tangent line in the tire circumferential direction.

6. The pneumatic tire according to claim 1, wherein the raised sections each are formed to have an acute-angle end oriented in a tire rotational direction.

7. The pneumatic tire according to claim 1, wherein the sipes are formed in a zigzag shape for use on an icy and snowy road.

8. A tire mold comprising a tread molding section with which the tread of the pneumatic tire according to claim 1 is shaped.

9. A method of manufacturing a pneumatic tire, the method comprising:
forming a green tire;
fitting the green tire to the tire mold according to claim 8;
attaching the green tire to the tire mold, while enlarging the green tire outwardly in a tire radial direction; and
heating the green tire so that vulcanization takes place.

* * * * *